US008223211B2

(12) United States Patent  (10) Patent No.: US 8,223,211 B2
Jang  (45) Date of Patent: Jul. 17, 2012

(54) DIGITAL PHOTOGRAPHING APPARATUS, METHOD OF CONTROLLING THE SAME, AND RECORDING MEDIUM STORING A PROGRAM FOR IMPLEMENTING THE METHOD

(75) Inventor: Sung-kyu Jang, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 12/290,155

(22) Filed: Oct. 28, 2008

(65) Prior Publication Data

US 2009/0147095 A1    Jun. 11, 2009

(30) Foreign Application Priority Data

Dec. 6, 2007   (KR) ......................... 10-2007-0126396

(51) Int. Cl.
   *H04N 5/228*   (2006.01)
(52) U.S. Cl. .............. 348/208.1; 348/222.1; 348/333.01
(58) Field of Classification Search ............. 348/208.12, 348/208.1
   See application file for complete search history.

(56) References Cited

U.S. PATENT DOCUMENTS

| 6,937,272 | B1 * | 8/2005 | Dance ......................... 348/208.2 |
| 7,379,566 | B2 * | 5/2008 | Hildreth ....................... 382/107 |
| 7,848,542 | B2 * | 12/2010 | Hildreth ....................... 382/107 |
| 8,063,942 | B2 * | 11/2011 | Hung et al. ................. 348/222.1 |
| 2002/0015094 | A1 * | 2/2002 | Kuwano et al. ............... 348/143 |
| 2004/0070675 | A1 * | 4/2004 | Fredlund et al. ........... 348/208.1 |
| 2006/0146009 | A1 * | 7/2006 | Syrbe et al. ................... 345/156 |
| 2006/0181510 | A1 * | 8/2006 | Faith ............................. 345/158 |
| 2007/0273641 | A1 * | 11/2007 | Aarras et al. .................. 345/156 |
| 2008/0117168 | A1 * | 5/2008 | Liu et al. ........................ 345/158 |
| 2008/0166022 | A1 * | 7/2008 | Hildreth ......................... 382/107 |
| 2008/0244467 | A1 * | 10/2008 | Kim et al. ...................... 715/863 |
| 2008/0297474 | A1 * | 12/2008 | Blomqvist et al. ............ 345/158 |
| 2009/0089705 | A1 * | 4/2009 | Panabaker et al. ............ 715/784 |
| 2009/0228841 | A1 * | 9/2009 | Hildreth ....................... 715/863 |
| 2012/0032901 | A1 * | 2/2012 | Kwon ........................... 345/173 |

FOREIGN PATENT DOCUMENTS

| JP | 2005252603 A * | 9/2005 |
| KR | 10-2005-0039950 A | 5/2005 |
| KR | 10-2006-0044206 A | 5/2006 |
| KR | 10-2006-0071759 A | 6/2006 |

* cited by examiner

*Primary Examiner* — Nicholas Giles
*Assistant Examiner* — Cynthia Segura
(74) *Attorney, Agent, or Firm* — Drinker Biddle & Reath LLP

(57) ABSTRACT

A digital photographing apparatus, a method of controlling the digital photographing apparatus, and a recording medium storing a program for implementing the method are provided in a manner by which a user can enjoy maximized convenience in manipulating the digital photographing apparatus. The method includes (a) determining a motion direction of the digital photographing apparatus by analyzing image data obtained from light that is incident on an imaging device; and (b) switching from a current mode of the digital photographing apparatus to another mode corresponding to the motion direction determined in (a).

21 Claims, 8 Drawing Sheets

DIGITAL PHOTOGRAPHING APPARATUS, METHOD OF CONTROLLING THE SAME, AND RECORDING MEDIUM STORING A PROGRAM FOR IMPLEMENTING THE METHOD

CROSS-REFERENCE TO RELATED PATENT APPLICATION

This application claims the benefit of Korean Patent Application No. 10-2007-0126396, filed on Dec. 6, 2007, in the Korean Intellectual Property Office, the entire contents of which is incorporated herein by reference.

BACKGROUND OF THE INVENTION

1. Field of the Invention

The present invention relates to a digital photographing apparatus, a method of controlling the same, and a recording medium storing a program for implementing the method. More particularly, the present invention relates to a digital photographing apparatus, a method of controlling the same, and a recording medium storing a program for implementing the method, by which convenience for a user to manipulate the digital photographing apparatus is maximized.

2. Description of the Related Art

A conventional digital photographing apparatus stores an image file obtained by a photographing operation in a photographing mode into a storage medium and displays an image on a display unit by reproducing an image file stored in the storage medium, in a playback mode. Also, the digital photographing apparatus reproduces the image file obtained by the photographing operation in the photographing mode. In addition to the photographing mode and the playback mode, the digital photographing apparatus may operate in various modes such as an operating environment setting mode.

In the conventional digital photographing apparatus, it is inconvenient for a user to have to click a button or rotate a dial which are provided on the digital photographing apparatus in order to switch modes from among the various modes including, for example, the photographing mode, the playback mode, and the operating environment setting mode. Furthermore, it is inconvenient for the user to also be required to click or rotate the button or the dial in order to switch from the image displayed on the display unit of the digital photographing apparatus to another image.

SUMMARY OF THE INVENTION

The present invention provides a digital photographing apparatus, a method of controlling the same, and a recording medium storing a program for implementing the method, by which convenience for a user to manipulate the digital photographing apparatus is maximized.

According to an embodiment of the present invention, a method of controlling a digital photographing apparatus is provided. The method includes (a) determining a motion direction of the digital photographing apparatus by analyzing image data obtained from light that is incident on an imaging device; and (b) switching a mode of the digital photographing apparatus into another mode corresponding to the motion direction determined in (a).

According to another embodiment of the present invention, a method of controlling a digital photographing apparatus when the digital photographing apparatus in a playback mode in which an image is displayed on a display unit by reproducing an image file stored in a storage medium is provided. The method includes (a) determining a motion direction of the digital photographing apparatus by analyzing image data obtained from light that is incident on an imaging device; and (b) switching a number of images displayed on the display unit to a different number of images or switching from the image displayed on the display unit into another image, in accordance with the motion direction determined in (a).

The switching method (b) may include stopping displaying a first image displayed on the display unit which corresponds to a first image file stored in the storage medium and displaying a second image corresponding to a second image file stored in the storage medium, on the display unit in accordance with the motion direction determined in (a).

If the motion direction determined in (a) is one direction, the second image file may be a subsequent image file of the first image file, and, if the motion direction determined in (a) is another direction, the second image file may be a previous image file of the first image file.

If the motion direction determined in (a) is one direction and then is changed to another direction, the second image file may be a subsequent image file of the first image file, and, if the motion direction determined in (a) is the other direction and then is changed to the one direction, the second image file may be a previous image file of the first image file.

The switching method (b) may include, if an image is displayed on the display unit, switching from the image to a plurality of images in accordance with the motion direction determined in (a) and, if a plurality of images are displayed on the display unit, switching from the plurality of images to an image in accordance with the motion direction determined in (a).

The switching method (b) may be performed only if a motion size corresponding to the motion direction determined in (a) during a preset period of time is larger than a preset motion size.

The method may further include (c) blocking the light from being incident on the imaging device if it is determined by analyzing the image data that the digital photographing apparatus does not move during a preset period of time.

The method may further include (c) not obtaining the image data from the light if it is determined by analyzing the image data that the digital photographing apparatus does not move during a preset period of time.

According to another embodiment of the present invention, a recording medium is provided, the recording medium having recorded thereon a computer program for executing the above method.

According to another embodiment of the present invention, a digital photographing apparatus is provided. The digital photographing apparatus includes an imaging device for obtaining image data from light that is incident on the imaging device; a motion determination unit for determining a motion direction of the digital photographing apparatus by analyzing the image data; and a mode switching unit for switching from a mode of the digital photographing apparatus to another mode corresponding to the motion direction determined by the motion determination unit.

The mode switching unit may operate only if a motion size corresponding to the motion direction determined by the motion determination unit during a preset period of time is larger than a preset motion size.

According to another embodiment of the present invention, a digital photographing apparatus is provided. The digital photographing apparatus includes an imaging device for obtaining image data from light that is incident on the imaging device; a motion determination unit for determining a motion direction of the digital photographing apparatus by analyzing the image data; and an image switching unit for switching the number of images displayed on a display unit of the digital photographing apparatus in a playback mode to a different number of images or switching from an image displayed on the display unit to another image, in accordance with the motion direction determined by the motion determination unit.

The image switching unit may stop displaying a first image displayed on the display unit which corresponds to a first image file stored in a storage medium and display a second image corresponding to a second image file stored in the storage medium, on the display unit in accordance with the motion direction determined by the motion determination unit.

If the motion direction determined by the motion determination unit is one direction, the second image file may be a subsequent image file of the first image file, and, if the motion direction determined by the motion determination unit is another direction, the second image file may be a previous image file of the first image file.

If the motion direction determined by the motion determination unit is one direction and then is changed to another direction, the second image file may be a subsequent image file of the first image file, and, if the motion direction determined by the motion determination unit is the other direction and then is changed to the one direction, the second image file may be a previous image file of the first image file.

If an image is displayed on the display unit, the image switching unit may switch from the image to a plurality of images in accordance with the motion direction determined by the motion determination unit and, if a plurality of images are displayed on the display unit, the image switching unit may switch from the plurality of images to an image in accordance with the motion direction determined by the motion determination unit.

The mode switching unit may operate only if a motion size corresponding to the motion direction determined by the motion determination unit during a preset period of time is larger than a preset motion size.

The light may be blocked from being incident on the imaging device if the motion determination unit determines that the digital photographing apparatus does not move during a preset period of time.

The image data may not be obtained from the light if the motion determination unit determines that the digital photographing apparatus does not move during a preset period of time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
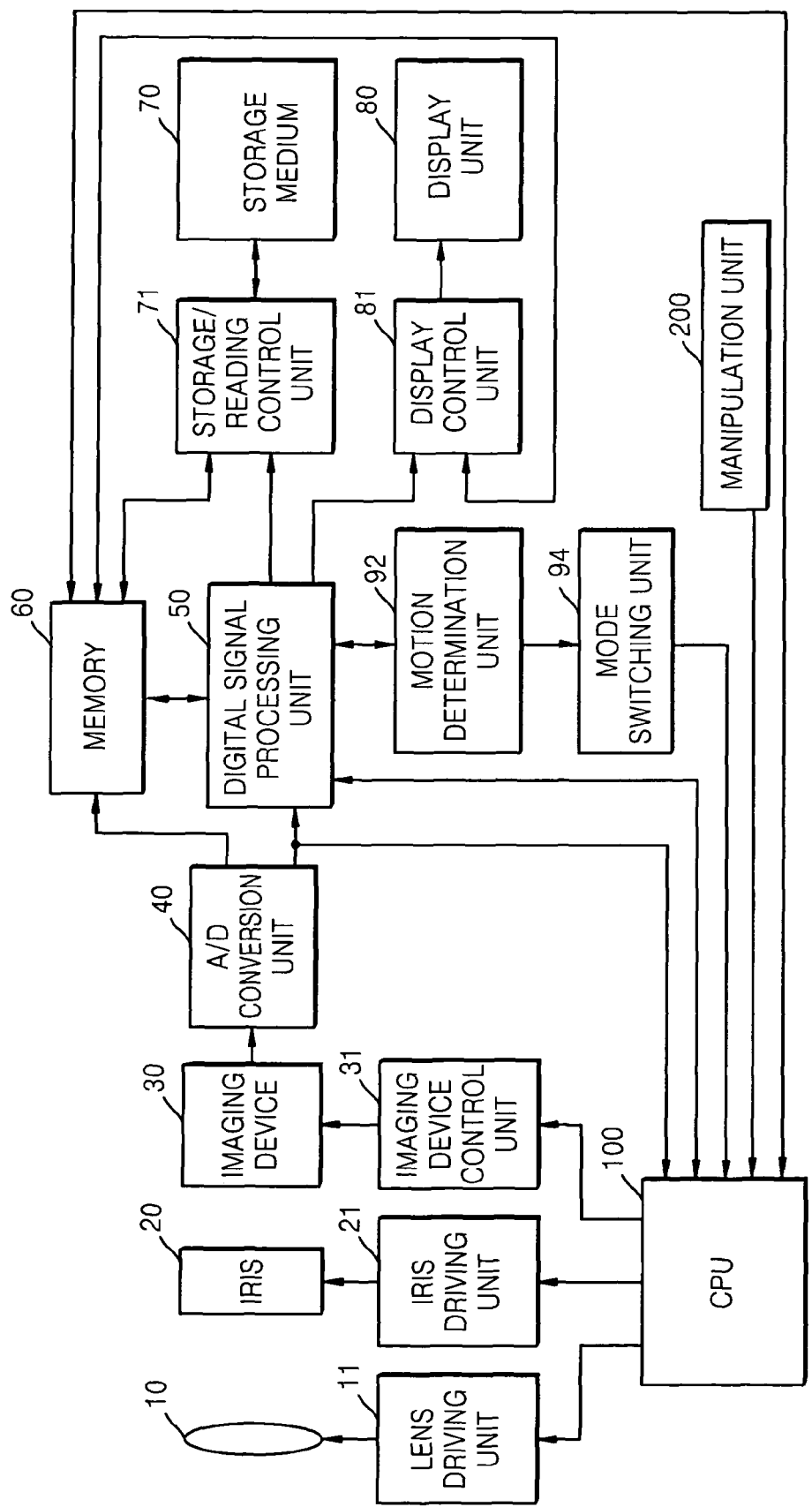
FIG. 1 is a schematic block diagram of an example of a digital photographing apparatus according to an embodiment of the present invention.

FIG. 1 is a schematic block diagram of an example of a digital photographing apparatus according to an embodiment of the present invention.

Referring to FIG. 1, general operation of the digital photographing apparatus is managed by a central processing unit (CPU) 100. The digital photographing apparatus includes a manipulation unit 200 including keys for enabling a user to generate electric signals. The electric signals generated in the manipulation unit 200 are transmitted to the CPU 100 so that the CPU 100 controls the digital photographing apparatus in accordance with the electric signals.

In a photographing mode, an electric signal generated by the user is applied to the CPU 100 and the CPU 100 receives the electric signal so as to control a lens driving unit 11, an iris driving unit 21, and an imaging device control unit 31. Thus, a position of a lens 10, an exposure value of an iris 20, and sensitivity of an imaging device 30 are respectively controlled. If analog image data is output from the imaging device 30, an analog/digital (A/D) conversion unit 40 converts the analog image data into digital image data and the digital image data is input to the CPU 100, a digital signal processing unit 50 and/or a memory 60. If the imaging device 30 generates digital image data, the A/D conversion unit 40 may be omitted. The digital signal processing unit 50 performs digital signal processing such as gamma compensation or white balance adjustment on the digital image data. The memory 60 may be read-only memory (ROM) or random access memory (RAM).

The image data output from the digital signal processing unit 50 is transmitted to a display control unit 81 directly or through the memory 60. The display control unit 81 controls a display unit 80 to display an image. Also, the image data output from the digital signal processing unit 50 is input to a storage/reading control unit 71 directly or through the memory 60. The storage/reading control unit 71 automatically stores the image data in a storage medium 70 or stores it in accordance with a signal input by the user. Here, it is obvious that the storage/reading control unit 71 may read image data from an image file stored in the storage medium 70 and input the image data to the display control unit 81 through the memory 60 or by another path so that an image is displayed on the display unit 80. The storage medium 70 may be temporarily or permanently mounted in the digital photographing apparatus.

Meanwhile, the image data output from the digital signal processing unit 50 is also input to a motion determination unit 92. The motion determination unit 92 analyzes the image data obtained from light that is incident on the imaging device 30 and determines a motion direction of the digital photographing apparatus. If the motion determination unit 92 determines the motion direction, a mode switching unit 94 switches a mode of the digital photographing apparatus into another mode corresponding to the motion direction determined by the motion determination unit 92.

The digital photographing apparatus illustrated in FIG. 1 corresponds to an embodiment of the present invention but the present invention is not limited thereto. Also, the data transmission paths between elements of the digital photographing apparatus illustrated in FIG. 1 are only examples and the present invention is not limited thereto. Furthermore, although the motion determination unit 92 and the mode switching unit 94 are separate from the digital signal processing unit 50 and the CPU 100 in FIG. 1, it is obvious that various changes may be made thereto. For example, one or both of the motion determination unit 92 and the mode switching unit 94 may be included in the digital signal processing unit 50 or the CPU 100. In this case, the motion determination unit 92 or the mode switching unit 94 may be included in the form of a program, for example. The above description can also be applied to subsequent embodiments of the present invention.

FIGS. 2A through 2E are schematic conceptual views of examples of images obtained from light that is incident on the imaging device 30 illustrated in FIG. 1 for describing a method of determining a motion direction of the digital photographing apparatus illustrated in FIG. 1 by the motion determination unit 92 illustrated in FIG. 1. FIGS. 2A through 2E will be described in conjunction with FIG. 1. The images illustrated in FIGS. 2A through 2E may or may not be displayed on the display unit 80, for example,.

As described above, the digital photographing apparatus includes the imaging device 30 and the imaging device 30 obtains image data from light that is incident on the imaging device 30. In a conventional digital photographing apparatus, light is incident on an imaging device or image data is obtained from the light so as to display a (for example, real-time video) image on a display unit only if the conventional digital photographing apparatus is in a photographing mode (for example, a live view mode). However, in the digital photographing apparatus example according to the current embodiment, light is incident on the imaging device 30 and image data is obtained from the light no matter what mode the digital photographing apparatus is in, including, for example, the photographing mode. The motion determination unit 92 determines, for example, a motion direction and/or a motion size of the digital photographing apparatus from the image data. Here, it is obvious that an image is not displayed on the display unit 80 if the image data is obtained from the light in any other mode apart from the photographing mode.

Figure 2A:
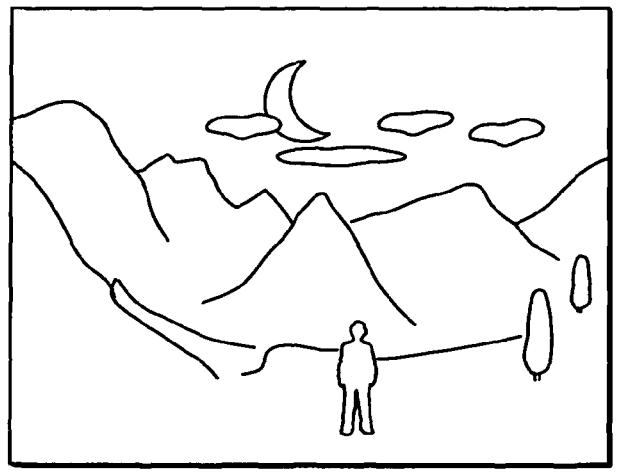
FIGS. 2A through 2E are schematic conceptual views of examples of images obtained from light that is incident on an imaging device illustrated in FIG. 1, for describing a method of determining a motion direction of the digital photographing apparatus illustrated in FIG. 1 by a motion determination unit illustrated in FIG. 1.
Figure 2B:
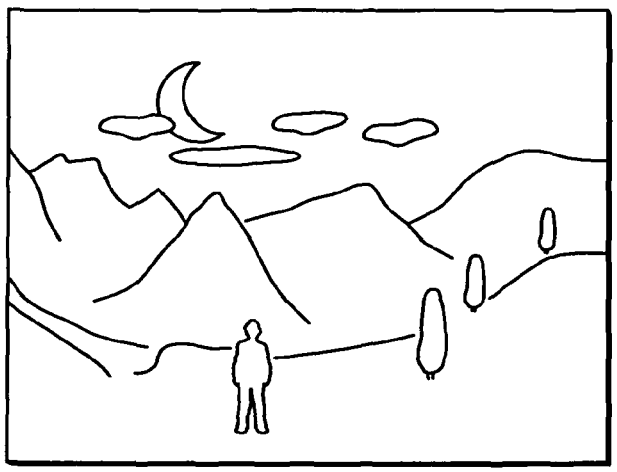
Figure 2C:
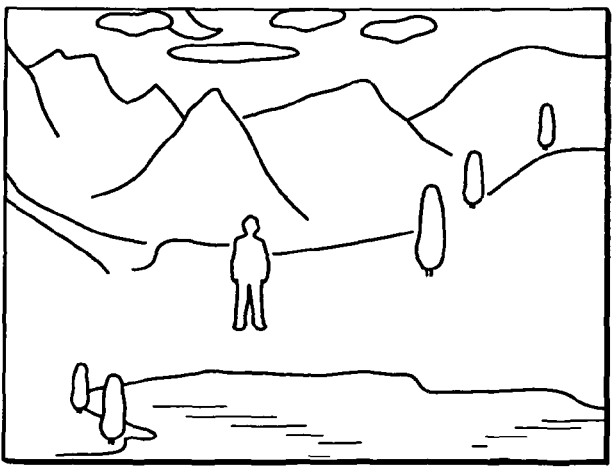
Figure 2D:
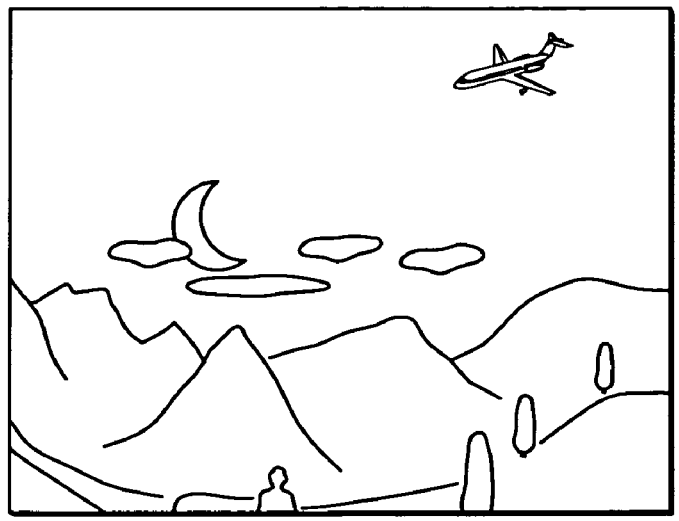

For example, if data corresponding to an image illustrated FIG. 2A is obtained and then data corresponding to an image illustrated FIG. 2B is obtained by the imaging device 30, the motion determination unit 92 determines that the digital photographing apparatus moves to the right. A fact that a subject moves to the left means that the digital photographing apparatus moves to the right. On the other hand, if the data corresponding to the image illustrated FIG. 2B is obtained and then the data corresponding to the image illustrated FIG. 2A is obtained by the imaging device 30, the motion determination unit 92 determines that the digital photographing apparatus moves to the left. Likewise, if the data corresponding to the image illustrated FIG. 2B is obtained and then data corresponding to an image illustrated FIG. 2C is obtained by the imaging device 30, the motion determination unit 92 determines that the digital photographing apparatus moves downwards, and if the data corresponding to the image illustrated FIG. 2B is obtained and then data corresponding to an image illustrated FIG. 2D is obtained by the imaging device 30, the motion determination unit 92 determines that the digital photographing apparatus moves upwards. Meanwhile, if the data corresponding to the image illustrated FIG. 2A is obtained, the data corresponding to the image illustrated FIG. 2B is obtained, and then the data corresponding to the image illustrated FIG. 2C is obtained by the imaging device 30, the motion determination unit 92 determines that the digital photographing apparatus moves to the right and then downwards. That is, the motion determination unit 92 determines that the digital photographing apparatus moves in a reverse upside-down L-shaped direction. Here, it is obvious that the motion determination unit 92 may determine any other motion direction of the digital photographing apparatus.

Various algorithms may be used when the motion determination unit 92 determines motion of the digital photographing apparatus from the image data. For example, an algorithm of "An Interactive Image Registration Technique with an Application to Stereo Vision" published at Proc. of Int. Joint Conference by B. Lucas and T. Kanade in 1981 may be used. This algorithm is referred to as the Lucas-Kanade method of estimating global motion which is well known in the field of vision. In addition, various changes may be made in these regards. For example, the motion of the digital photographing apparatus may be determined in accordance with motion of a characteristic individual object.

Also along these lines, the motion of the digital photographing apparatus may be determined, for example, by including a gyro sensor. In this case, it is inconvenient to include an additional element such as the gyro sensor. In particular, the gyro sensor is expensive and thus the price of the digital photographing apparatus is increased if a gyro sensor is added to the digital photographing apparatus. However, in the digital photographing apparatus example according to the current embodiment, the motion of the digital photographing apparatus is determined by analyzing the image data obtained from the light that is incident on the imaging device 30 by the motion determination unit 92, instead of including a gyro sensor. Thus, the price of the digital photographing apparatus may be greatly reduced in comparison with a case where the gyro sensor is included in the digital photographing apparatus.

If the motion determination unit 92 determines the motion direction of the digital photographing apparatus as described above, the mode switching unit 94 switches a mode of the digital photographing apparatus to another mode corresponding to the motion direction determined by the motion determination unit 92. For example, when the digital photographing apparatus is in a playback mode, if the motion determination unit 92 determines that the digital photographing apparatus moves to the right, the mode switching unit 94 may switch the mode of the digital photographing apparatus from the playback mode to an operating environment setting mode. Here, it is obvious that, if the motion determination unit 92 determines that the digital photographing apparatus moves in another direction, the mode switching unit 94 switches the mode of the digital photographing apparatus to another mode corresponding to the determined direction.

Also, various changes may be made in these regards. For example, when the digital photographing apparatus is in the photographing mode, if the motion determination unit 92 determines that the digital photographing apparatus moves in a certain direction, the mode switching unit 94 may switch the mode of the digital photographing apparatus to a shutdown mode so as to shut down the digital photographing apparatus.

In the conventional digital photographing apparatus, it is inconvenient for a user to have to click a button or rotate a dial which are included in the digital photographing apparatus in order to switch modes from among various modes including the photographing mode, the playback mode, and the operating environment setting mode, for example. However, in the digital photographing apparatus according to the current embodiment, the user may easily and promptly switch modes by moving the digital photographing apparatus in a preset direction, for example.

Figure 2E:
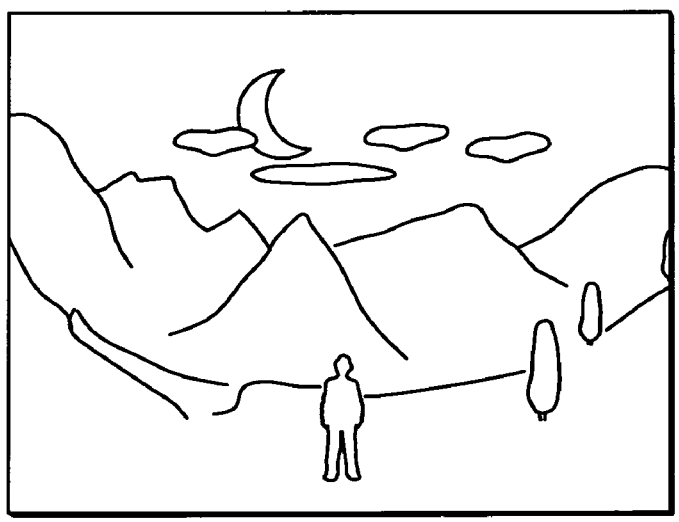

In the digital photographing apparatus according to the current embodiment, the mode switching unit 94 may operate only if the motion size of the digital photographing apparatus during a preset period of time is larger than a preset motion size. For example, as a result of analyzing the image data obtained from the light that is incident on the imaging device 30, if the light is incident as illustrated in FIG. 2A and then is changed as illustrated in FIG. 2B, the motion size of the digital photographing apparatus may be determined to be larger than the preset motion size and thus the mode switching unit 94 may operate. However, if the light is incident as illustrated in FIG. 2A and then is changed as illustrated in FIG. 2E, the motion size of the digital photographing apparatus may be determined to be smaller than the preset motion size and thus the mode switching unit 94 may not operate. The motion size of the digital photographing apparatus is compared to the preset motion size in order not to switch the modes when the digital photographing apparatus unintentionally moves due to, for example, a user's hand shaking. Also, although the light is incident as illustrated in FIG. 2A and then is changed as illustrated in FIG. 2B, if the light is not changed during the preset period of time, it may be regarded that the user does not intend to switch modes.

Meanwhile, when the light incident on the imaging device 30 is sensed and the image data is obtained from the light, the digital photographing apparatus consumes electric power. Accordingly, when necessary, if the motion determination unit 92 determines that the digital photographing apparatus does not move during the preset period of time, an increase in power consumption may be prevented by blocking the light from being incident on the imaging device 30. Here, it is obvious that various changes may be made. For example, if the motion determination unit 92 determines that the digital photographing apparatus does not move during the preset period of time, the increase in power consumption may be prevented by allowing the light to be continuously incident on the imaging device 30 and not obtaining the image data from the light.

Figure 3:
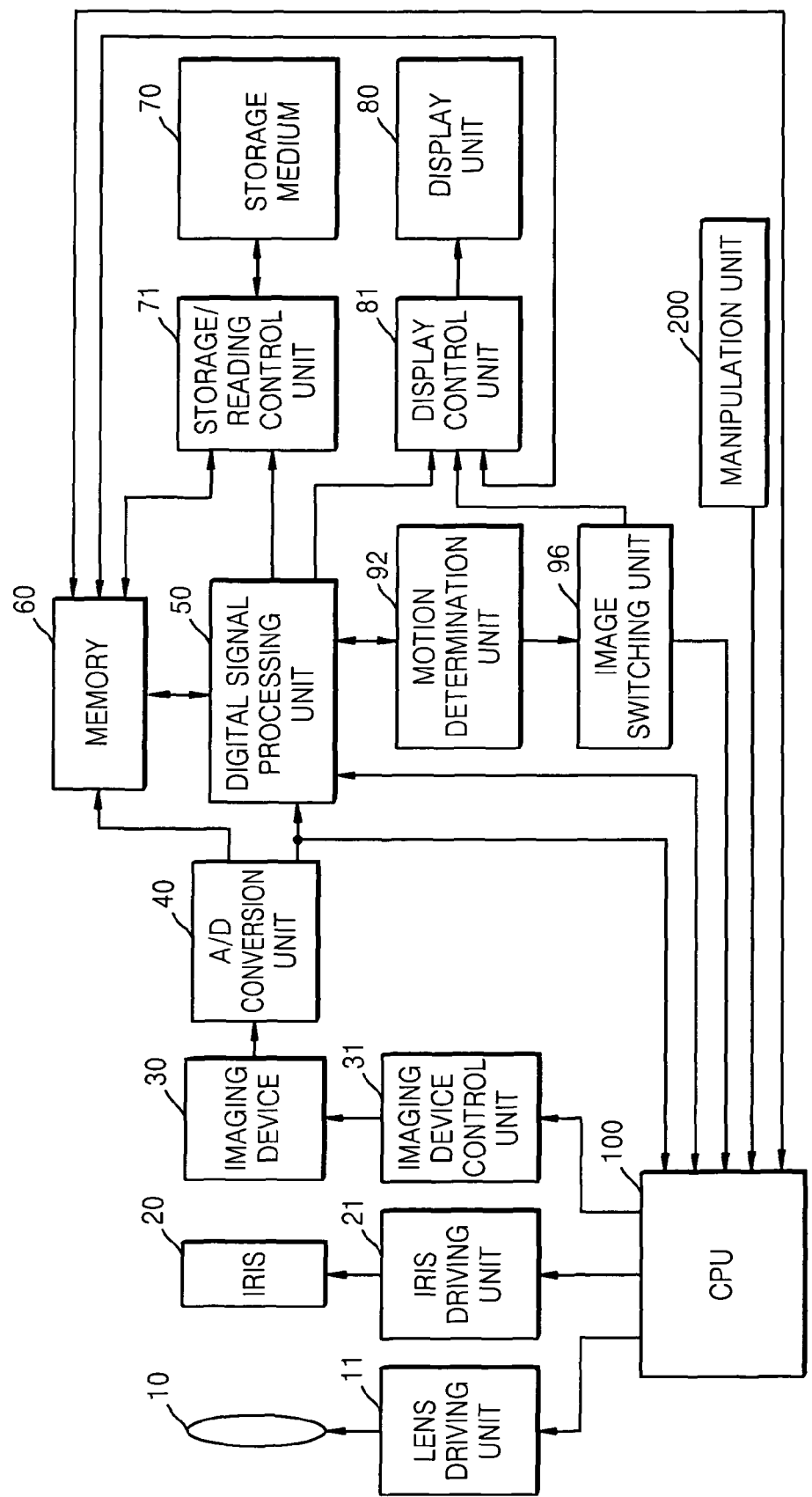
FIG. 3 is a schematic block diagram of an example of a digital photographing apparatus according to another embodiment of the present invention.

FIG. 3 is a schematic block diagram of an example of a digital photographing apparatus according to another embodiment of the present invention.

Referring to FIG. 3, the digital photographing apparatus according to the current embodiment is different from the digital photographing apparatus according to the previous embodiment of FIG. 1 in that an image switching unit 96 is included in the digital photographing apparatus instead of the mode switching unit 94. Other elements are the same as corresponding elements illustrated in FIG. 1. When the digital photographing apparatus is in a playback mode, the image switching unit 96 switches an image displayed on the display unit 80 into another image in accordance with a motion direction determined by the motion determination unit 92.

Figure 4:
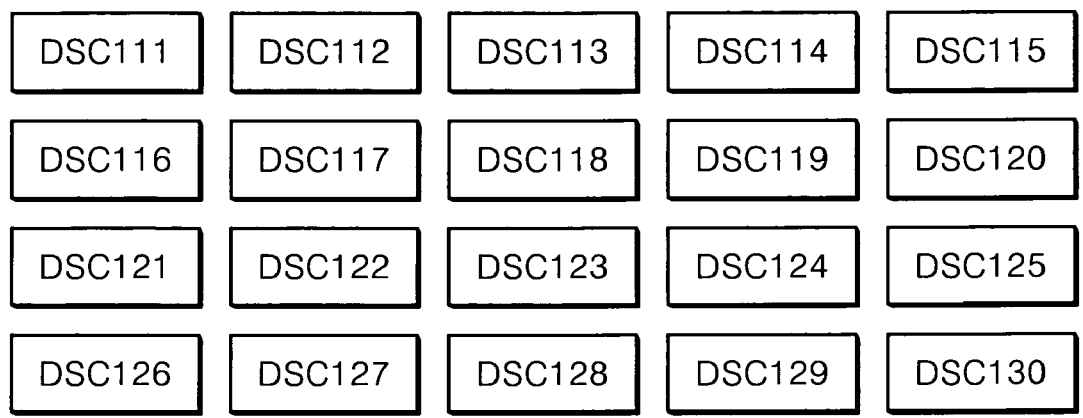
FIG. 4 is a conceptual view for describing an example of the arrangement of image files stored in a storage medium of the digital photographing apparatus illustrated in FIG. 3, according to an embodiment of the present invention.

FIG. 4 is a conceptual view for describing an example of the arrangement of image files stored in a storage medium of the digital photographing apparatus illustrated in FIG. 3, according to an embodiment of the present invention. FIG. 4 will be described in conjunction with FIG. 3. The digital photographing apparatus according to the current embodiment stores data of still images obtained by a photographing operation in the storage medium 70 in the form of image files. The image files stored in the storage medium 70 are conceptually illustrated in FIG. 4. DSC111 through DSC130 are the names of the image files. When the digital photographing apparatus is in a playback mode, if the motion determination unit 92 determines a motion direction of the digital photographing apparatus while a first image is being displayed on the display unit 80 by reproducing a first image file, the image switching unit 96 stops displaying the first image corresponding to the first image file and displays a second image corresponding to a second image file stored in the storage medium 70, on the display unit 80, for example, in accordance with the determined motion direction.

For example, if data corresponding to an image illustrated FIG. 2A is obtained and then data corresponding to an image illustrated FIG. 2B is obtained by the imaging device 30 while the first image is being displayed on the display unit 80 by reproducing an image file DSC118 as the first image file, the motion determination unit 92 determines that the digital photographing apparatus moves to the right, for example (in one direction). Thus, the image switching unit 96 selects an image file DSC119 that is a subsequent image file of the image file DSC118, as the second image file and displays the second image on the display unit 80 by reproducing the image file DSC119 as the second image file. On the other hand, if the data corresponding to the image illustrated FIG. 2B is obtained and then the data corresponding to the image illustrated FIG. 2A is obtained by the imaging device 30 while the first image is being displayed on the display unit 80 by reproducing the image file DSC118 as the first image file, the motion determination unit 92 determines that the digital photographing apparatus moves to the left, for example (in another direction). Thus, the image switching unit 96 selects an image file DSC117 that is a previous image file of the image file DSC118, as the second image file and displays the second image on the display unit 80 by reproducing the image file DSC117 as the second image file.

Meanwhile, when the digital photographing apparatus moves in order to switch from an image displayed on the display unit 80, for example, to another image, the digital photographing apparatus may move not only in one direction but also in various directions as if the digital photographing apparatus shakes. For example, if the data corresponding to the image illustrated FIG. 2A is obtained, the data corresponding to the image illustrated FIG. 2B is obtained, and then the data corresponding to the image illustrated FIG. 2A is obtained again by the imaging device 30 while the first image is being displayed on the display unit 80 by reproducing the image file DSC118 as the first image file, it may be regarded that the digital photographing apparatus shakes to the right. In this case, the motion determination unit 92 determines that the digital photographing apparatus moves to the right and then to the left. Accordingly, if the digital photographing apparatus shakes to the right as described above, the image switching unit 96 may select, for example, the image file DSC119 that is the subsequent image file of the image file DSC118, as the second image file and display the second image on the display unit 80 by reproducing the image file DSC119 as the second image file. Here, it is obvious that, if the digital photographing apparatus shakes to the left, the image switching unit 96 may select, for example, the image file DSC117 that is the previous image file of the image file DSC118, as the second image file and display the second image on the display unit 80 by reproducing the image file DSC117 as the second image file.

In this case, it is also obvious that various changes may be made in these regards. For example, if the data corresponding to the image illustrated FIG. 2A is obtained, the data corresponding to the image illustrated FIG. 2B is obtained, and then data corresponding to an image illustrated FIG. 2C is obtained, the motion determination unit 92 determines that the digital photographing apparatus moves to the right and then downwards. That is, the motion determination unit 92 determines that the digital photographing apparatus moves in a reverse upside-down L-shaped direction so that the motion determination unit 92 may display an image on the display unit 80 by reproducing an image file corresponding to the result of the determination.

The above embodiment is described by assuming that the digital photographing apparatus moves or shakes to the left or right. However, various changes may be made thereto in these regards. For example, an image displayed on the display unit 80 may be switched to another image by moving or shaking the digital photographing apparatus upwards or downwards. Also, various changes may be made to the second image to be switched. For example, if the first image corresponding to the image file DSC118 is displayed, the first image may be switched, for example, to the second image corresponding to an image file DSC113 or an image file DSC123 in accordance with the motion direction of the digital photographing apparatus.

Switching from an image displayed on the display unit 80 to another image by the image switching unit 96 in accordance with the motion direction of the digital photographing apparatus is described with reference to FIG. 4. However, when the digital photographing apparatus is in the playback mode, the image switching unit 96 may switch the number of images displayed on the display unit 80 to a different number of images in accordance with the motion direction of the digital photographing apparatus, which is determined by the motion determination unit 92. For example, if an image is displayed on the display unit 80, the image switching unit 96 may switch from the image to a plurality of images in accordance with the motion direction of the digital photographing apparatus. On the other hand, if a plurality of images are displayed on the display unit 80, the image switching unit 96 may switch from the images to an image in accordance with the motion direction of the digital photographing apparatus.

Figure 5A:
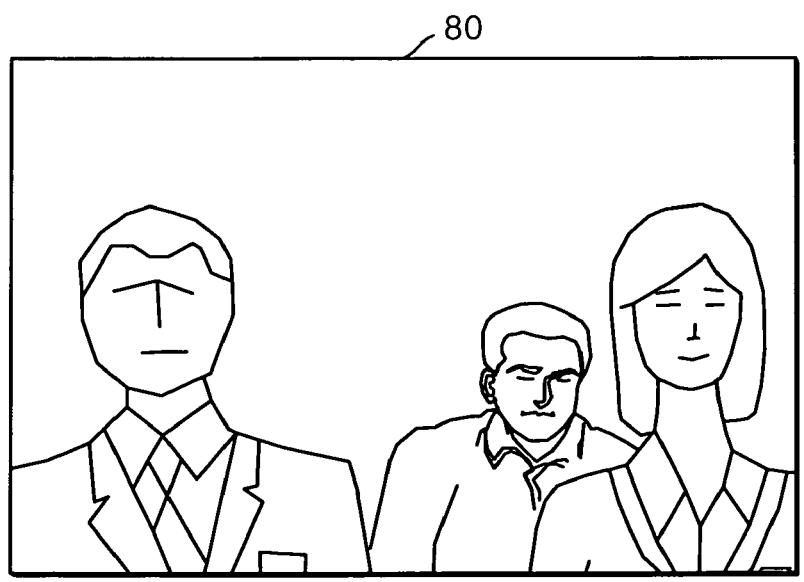
FIGS. 5A and 5B are schematic conceptual views of examples of images to be displayed on a display unit, for describing an operation of the digital photographing apparatus illustrated in FIG. 3, according to an embodiment of the present invention.
Figure 5B:
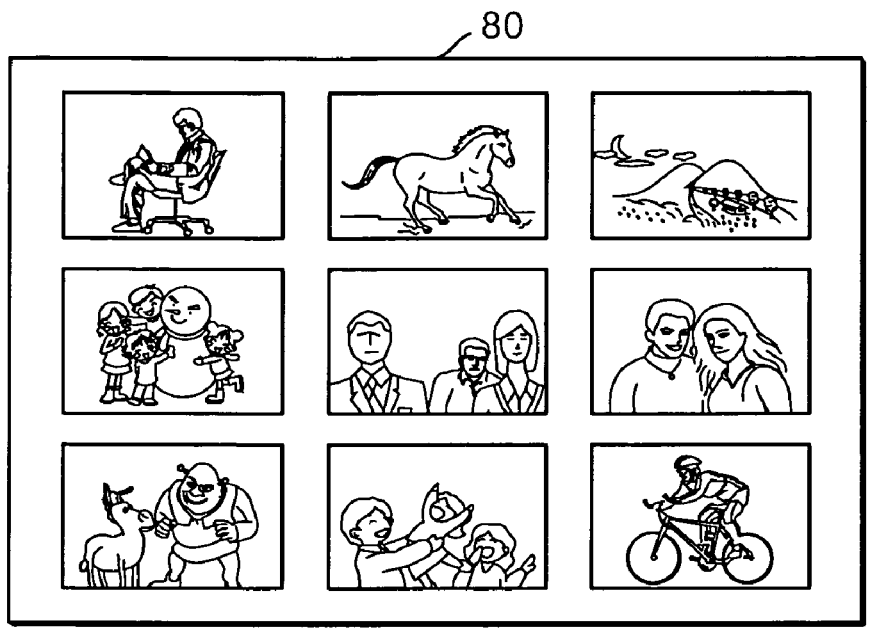

FIGS. 5A and 5B are schematic conceptual views of examples of images to be displayed on the display unit 80 illustrated in FIG. 3, according to an embodiment of the present invention. FIGS. 5A and 5B will be described in conjunction with FIG. 3.

If the motion determination unit 92 determines that a digital photographing apparatus moves in a certain direction while an image is being displayed on the display unit 80 as illustrated in FIG. 5A, the image switching unit 96 may switch, for example, from the image to a plurality of images illustrated in FIG. 5B. Here, when the images are displayed, in general, a plurality of thumb nail images are simultaneously displayed on the display unit 80. In this case, it is obvious that various changes may be made in these regards. For example, if the motion determination unit 92 determines that the digital photographing apparatus moves in a certain direction while the images are being displayed on the display unit 80 as illustrated in FIG. 5B, the image switching unit 96 may switch from the images to the image illustrated in FIG. 5A.

In the digital photographing apparatus according to the current embodiment, the image switching unit 96 may operate only, for example, if a motion size corresponding to the motion direction determined by the motion determination unit 92 during a preset period of time is larger than a preset motion size. The motion size of the digital photographing apparatus in this example is compared to the preset motion size in order not to switch images when the digital photographing apparatus unintentionally moves due to, for example, a user's hand shaking. Also, even if the motion size of the digital photographing apparatus is, for example, larger than the preset motion size, if the digital photographing apparatus does not move during the preset period of time, it may be regarded that the user does not intend to switch images.

Meanwhile, when light incident on the imaging device 30 is sensed and image data is obtained from the light, the digital photographing apparatus consumes electric power. Accordingly, when necessary, if the motion determination unit 92 determines that the digital photographing apparatus does not move during the preset period of time, an increase in power consumption may be prevented by blocking the light from being incident on the imaging device 30. Here, it is obvious that various changes may be made in these regards. For example, if the motion determination unit 92 determines that the digital photographing apparatus does not move during the preset period of time, the increase in power consumption may be prevented by allowing the light to be continuously incident on the imaging device 30 and not obtaining the image data from the light.

Figure 6:
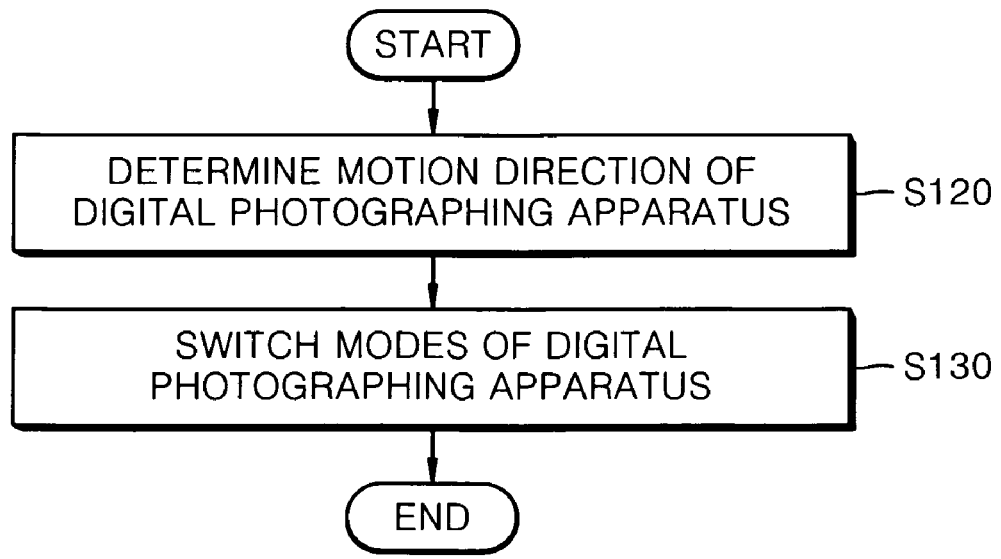
FIG. 6 is a flowchart of an example of a method of controlling a digital photographing apparatus, according to an embodiment of the present invention.

FIG. 6 is a flowchart of an example of a method of controlling a digital photographing apparatus, according to an embodiment of the present invention.

Referring to FIG. 6, a motion direction of the digital photographing apparatus is determined by analyzing image data obtained from light that is incident on an imaging device in operation S120. A mode of the digital photographing apparatus is switched to another mode corresponding to the motion direction in operation S130. As such, a user may easily switch modes of the digital photographing apparatus. Here, it is obvious that various changes may be made in these regards. For example, in order not to switch modes when the digital photographing apparatus unintentionally moves due to, for example, a user's hand shaking, operation S130 may be performed only if, for example, a motion size corresponding to the motion direction determined in operation S120 during a preset period of time is larger than a preset motion size.

Figure 7:
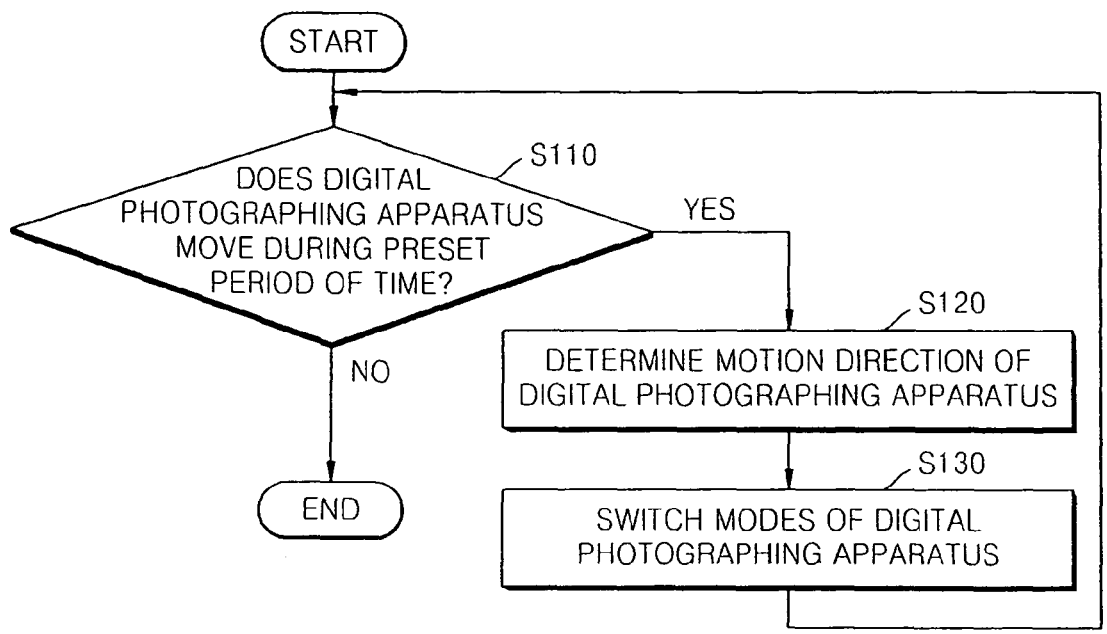
FIG. 7 is a flowchart of an example of a method of controlling a digital photographing apparatus, according to another embodiment of the present invention.

FIG. 7 is a flowchart of a method of controlling a digital photographing apparatus, according to another embodiment of the present invention.

Referring to FIG. 7, a determination is made of whether the digital photographing apparatus moves during a preset period of time in operation S10. If the digital photographing apparatus does not move during a preset period of time, the method is terminated because the digital photographing apparatus consumes electric power when light incident on an imaging device is sensed and image data is obtained from the light. Here, the method may be terminated by blocking the light from being incident on the imaging device or by allowing the light to be continuously incident on the imaging device and not obtaining the image data from the light. In FIG. 7, if the digital photographing apparatus does move during a preset period of time, the method continues with steps S120 and S130 which are discussed in connection with FIG. 6.

Figure 8:
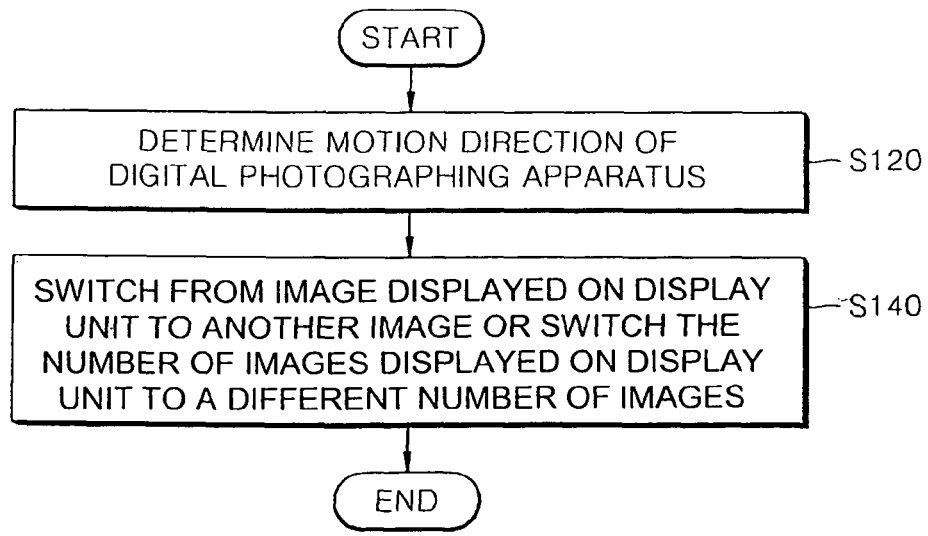
FIG. 8 is a flowchart of an example of a method of controlling a digital photographing apparatus, according to another embodiment of the present invention.

FIG. 8 is a flowchart of a method of controlling a digital photographing apparatus, according to another embodiment of the present invention.

Referring to FIG. 8, a motion direction of the digital photographing apparatus is determined by analyzing image data obtained from light that is incident on an imaging device in operation S120. An image displayed on a display unit is switched to another image or the number of images displayed on the display unit is switched to a different number of images, in accordance with the motion direction in operation S140. As such, a user may easily switch images displayed on the display unit or the number of images displayed on the display unit. Detailed operations of switching the images or the numbers of images are described above with reference to FIG. 3. Here, it is obvious that various changes may be made in these regards. For example, in order not to switch images or the number of images when the digital photographing apparatus unintentionally moves due to, for example, a user's hand shaking, operation S140 may be performed only if a motion size corresponding to the motion direction determined in operation S120 during a preset period of time is larger than a preset motion size.

Figure 9:
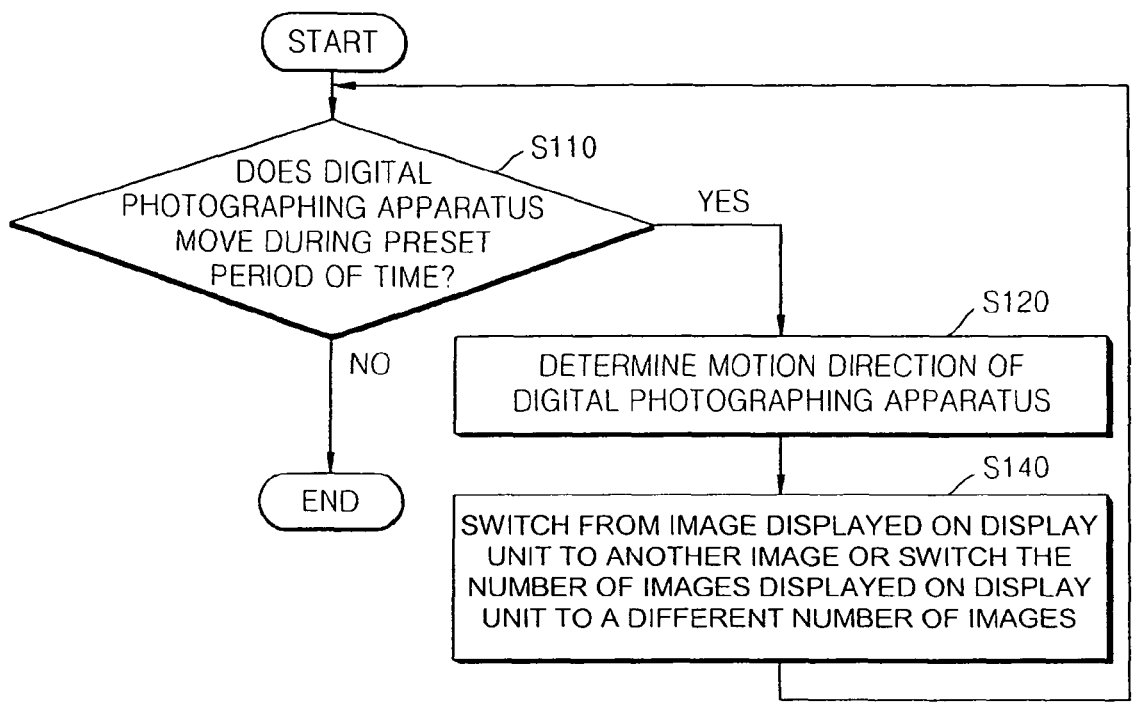
FIG. 9 is a flowchart of an example of a method of controlling a digital photographing apparatus, according to another embodiment of the present invention.

FIG. 9 is a flowchart of a method of controlling a digital photographing apparatus, according to another embodiment of the present invention.

Referring to FIG. 9, it is determined whether the digital photographing apparatus moves during a preset period of time in operation S110. If the digital photographing apparatus does not move during a preset period of time, the method is terminated because the digital photographing apparatus consumes electric power when light incident on an imaging device is sensed and image data is obtained from the light. Here, the method may be terminated by blocking the light from being incident on the imaging device or by allowing the light to be continuously incident on the imaging device and not obtaining the image data from the light. In FIG. 9, if the digital photographing apparatus does move during a preset period of time, the method continues with steps S120 and S140 which are discussed in connection with FIG. 8.

A program for executing a method of controlling a digital photographing apparatus in the digital photographing apparatus according to the above embodiments of the present invention can be written in a recording medium. Here, examples of the recording medium include magnetic storage media (e.g., ROM, floppy disks, hard disks, and the like) and optical recording media (e.g., CD-ROMs, or DVDs). For example, the recording medium may be the CPU 100 illustrated in FIG. 1 or a portion of the CPU 100.

As described above, according to the present invention, it is possible for a user to maximize the convenience of manipulating the digital photographing apparatus.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a digital photographing apparatus, the method comprising:
   determining a motion direction of the digital photographing apparatus by analyzing image data obtained from light incident on an imaging device; and
   switching from a first mode of the digital photographing apparatus to a second mode based on the determined motion direction, wherein the first and second modes are different ones selected from a group consisting of a photographing mode, a playback mode, an operating environment setting mode, and a shutdown mode.

2. The method of claim 1, further comprising switching the first mode to the second mode based on the determined motion direction when an amount of motion corresponding to the determined motion direction is larger than a threshold.

3. The method of claim 1, further comprising blocking the light from being incident on the imaging device when the digital photographing apparatus does not move during a period of time.

4. The method of claim 1, further comprising not obtaining the image data from the light when the digital photographing apparatus does not move during a period of time.

5. A method of controlling a digital photographing apparatus in a playback mode, the method comprising:
   determining a motion direction of the digital photographing apparatus by analyzing image data obtained from light incident on an imaging device; and
   switching a number of images displayed on the display unit to a different number of non-overlapping images when the determined motion direction comprises a first direction.

6. The method of claim 5, wherein the switching of a number of images comprises, if a single image is displayed on the display unit, switching from the single image to a plurality of images in accordance with the motion of the first direction and, if the plurality of images are displayed on the display unit, switching from the plurality of images to a single image in accordance with the motion of the first direction.

7. The method of claim 5, further comprising switching the display when an amount of motion corresponding to the determined motion direction is larger than a threshold and the determined motion direction comprises the first direction.

8. The method of claim 5, further comprising blocking the light from being incident on the imaging device when the digital photographing apparatus does not move during a period of time.

9. The method of claim 5, further comprising not obtaining the image data from the light when the digital photographing apparatus does not move during a period of time.

10. A non-transitory recording medium having recorded thereon a computer program for executing at least the method of claim 5.

11. A digital photographing apparatus comprising:
   an imaging device to form image data from light incident on the imaging device; and
   a processing unit to switch the digital photographing apparatus from a first mode to a second mode based on a motion direction determined by analyzing the image data, wherein the first and second modes are different ones selected from a group consisting of a photographing mode, a playback mode an operating environment setting mode and a shutdown mode.

12. The digital photographing apparatus of claim 11, wherein the processing unit is to switch the first mode to the second mode based on the determined motion direction when an amount of motion corresponding to the motion direction is larger than a threshold.

13. The digital photographing apparatus of claim 11, wherein the processing unit is to block the light from being incident on the imaging device when the digital photographing apparatus does not move during a period of time.

14. The digital photographing apparatus of claim 11, wherein the imaging device does not form the image data from the light when the digital photographing apparatus does not move during a period of time.

15. The digital photographing apparatus of claim 11, further comprising a computer-readable medium storing machine-readable instructions that, when executed, cause the processing unit to at least switch the digital photographing apparatus from the first mode to the second mode based on the determined motion direction.

16. A digital photographing apparatus comprising:
an imaging device to form image data from light incident on the imaging device; and
a processing unit to:
determine a motion direction of the digital photographing apparatus by analyzing the image data; and
switch a number of images displayed on a display unit of the digital photographing apparatus in a playback mode to a different number of non-overlapping images, when the determined motion direction comprises a first direction.

17. The digital photographing apparatus of claim 16, wherein, if a single image is displayed on the display unit, the processing unit is to switch from the single image to a plurality of images in accordance with the motion of the first direction and, if the plurality of images are displayed on the display unit, the processing unit is to switch from the plurality of images to a single image in accordance with the motion of the first direction.

18. The digital photographing apparatus of claim 16, wherein the processing unit is to switch the display of the first plurality of images when an amount of motion corresponding to the determined motion direction is larger than a threshold and the determined motion direction comprises the first direction.

19. The digital photographing apparatus of claim 1, wherein the processing unit is to block the light from being incident on the imaging device when the digital photographing apparatus does not move during a period of time.

20. The digital photographing apparatus of claim 16, wherein the imaging device is not to form the image data from the light when the digital photographing apparatus does not move during a period of time.

21. The digital photographing apparatus of claim 16, further comprising a computer-readable medium storing machine-readable instructions that, when executed, cause the processing unit to at least switch the display of the first plurality of images to the display of the first image when the determined motion direction comprises the first direction.

* * * * *